(12) United States Patent
Ortega Gutierrez et al.

(10) Patent No.: US 10,203,689 B1
(45) Date of Patent: Feb. 12, 2019

(54) DETECTING PASSIVE FAILURE IN COOLING SYSTEMS

(71) Applicant: Amazon Technologies, Inc., Seattle, WA (US)

(72) Inventors: Felipe Enrique Ortega Gutierrez, Tacoma, WA (US); Gary S. Shankman, Olympia, WA (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

(21) Appl. No.: 15/275,087

(22) Filed: Sep. 23, 2016

(51) Int. Cl.
*G06F 1/20* (2006.01)
*G05B 23/02* (2006.01)

(52) U.S. Cl.
CPC ............ *G05B 23/0275* (2013.01); *G05B 2219/24033* (2013.01)

(58) Field of Classification Search
CPC ...... G05B 23/0275; G05B 2219/24033; G06F 1/20; G06F 1/206
USPC ................................................ 700/275, 299
See application file for complete search history.

(56) References Cited

U.S. PATENT DOCUMENTS

| 6,396,688 | B1* | 5/2002 | Davies | G06F 1/20 361/51 |
| 2006/0034699 | A1* | 2/2006 | Flanigan | F04D 27/001 417/42 |
| 2007/0081888 | A1* | 4/2007 | Harrison | F04D 19/007 415/47 |
| 2013/0156576 | A1* | 6/2013 | Warren | H05K 7/20172 416/1 |

* cited by examiner

*Primary Examiner* — Michael J Brown
(74) *Attorney, Agent, or Firm* — Kilpatrick Townsend & Stockton LLP

(57) ABSTRACT

Methods and systems for detecting passive failure in a cooling system that employs two or more actuators for moving a fluid can include outputting a control signal to cause the movement of an actuator, where the control signal is associated with an expected rate of movement of the actuator; receiving information concerning an output signal from the actuator that is associated with an actual rate of movement of the actuator; and comparing the actual rate of movement of the actuator with the expected rate of movement of the actuator. A passive failure can be detected when the actual rate of movement of the actuator falls outside a nominal range that is based on the control signal.

21 Claims, 10 Drawing Sheets

DETECTING PASSIVE FAILURE IN COOLING SYSTEMS

BACKGROUND

A datacenter typically contains a collection of computer servers and components for the management, operation and connectivity of those servers. Even in isolation, datacenter electronic components may generate sufficient heat that temperature management is important to prolong the life of the components and smooth and continuous operation of the datacenter.

Datacenter electronic components are often arranged together. For example, datacenter electronic components can be vertically arranged in racks or within server cabinets. When heat-generating electronic components are arranged together, however, the cumulative generation of heat can increase the ambient temperature and exacerbate the challenge of managing the temperature of individual components.

Datacenter electronic components may be cooled by passing air through the components. In some cases, this cooling is achieved by having individual components or groups of components equipped with fans that push air through the components. The effectiveness of a cooling system is related to the rate of airflow past the heat-generating components, therefore it is advantageous to generate a greater pressure drop in order to drive more air. Also, if the airflow stops, heat can build up very quickly, so it is also advantageous to have redundancy in the fans that drive the airflow. Often, the fans that push air through the components are arranged not only in parallel but also in series, such that the individual fans in a series can contributed to a greater overall pressure drop that is more effective at forcing air through the components, and more resilient to failure, than individual fans or fans in parallel only.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cooling systems generally operate by providing a flow of a working fluid that absorbs and removes heat from the components to be cooled. In systems such as datacenters, the components to be cooled may include servers and power management components. Similar cooling systems may be used for various other applications such as cooling personal computers, vehicles, power production facilities, for home or commercial cooling and ventilation systems, and the like. In most cases, the working fluid must be moved by way of a fan, pump, or other actuator. In cases where air is the working fluid, common actuators include fans, which may be arranged in parallel, in series, or both. Cooling may also be achieved by way of a liquid working fluid, in which case the applicable actuator is a pump.

Regardless of the choice of working fluid, the rate of cooling can be increased by increasing the flow rate of the working fluid. One way to increase this flow rate is to increase the pressure drop across the cooling system by placing more than one actuator in series. For example, a cooling system for an air-cooled electronic component, e.g. a server in a datacenter, may include one or more fan assemblies at an air inlet or at an air outlet of the component, and the fan assemblies can each include two or more fans in series for moving air. In some cases, the fans might be operating at the same speed, but often the fans will be operating at different speeds that are optimized to increase the total flow rate through the fan assembly. For example, a first fan in a series of fans can move at a first speed, and the second fan in the series can move at a lower or a higher speed. Similarly, for a water-cooled (or other liquid-cooled) system, two or more pump rotors may be positioned in the working fluid in series; and the second pump rotor may be operated at a higher speed than the first pump rotor. Although embodiments described herein generally will refer to fans, it will be understood that the principles described may be applied to pumps or other suitable actuators.

Cooling methods that employ multiple actuators in series have advantages over cooling methods that employ a single actuator. For example, a single actuator may be unable to achieve the same pressure jump as a series of actuators, resulting in a lower flow rate; or a single actuator may be required to spin at an unreasonably high speed to achieve the same pressure jump as two or more actuators in series. Also, a mechanical failure in a single-actuator cooling system may cause an abrupt halt to the cooling flow; whereas a mechanical failure in an actuator of a multiple-actuator system may only decrease the efficiency of the cooling system without causing a potentially catastrophic halt to the cooling flow. A failure that does not cause total cooling system failure may be termed a passive failure. However, the advantages of a multiple-actuator system also expose one disadvantage, in that the fluid flowing through a multiple-actuator system can cause a failed rotor to continue spinning passively. The passive spinning of a rotor in failure can make it difficult to detect a failure quickly, and the free-spinning rotor can potentially increase the load on any remaining actuators. Thus, one specific example of a passive failure is a failure of one fan in a multiple-fan (e.g. a multi-rotor cooling system) where the airflow caused by the operational fan causes the failed fan to continue spinning passively, obviating conventional methods of detecting the failure. Another example of a passive failure is a failure of a fan in a fluid pathway that contains fluid flow driven by a pressure difference, such that the fluid flow causes the failed fan to continue spinning passively. The failure mode may occur in a system where one or more fans are included in a fluid pathway in order to boost the flow rate or increase the pressure drop across the fluid pathway, but are not solely responsible for causing the fluid flow.

Embodiments described herein relate generally to methods and systems for cooling components of an industrial system such as a datacenter, and in particular, to methods and systems for detecting passive failure in a cooling system that employs multiple actuators. In embodiments, a cooling system employing multiple actuators to move a working fluid is configured to provide a control signal to each of the multiple actuators; and to receive an output signal from each of the multiple actuators. The cooling system can correlate a given control signal with a range of expected output signals from each actuator that signifies normal operation, i.e. active functioning of each actuator within normal bounds. The output signals from each actuator relate to the actual performance of each actuator, e.g. the actual rotational speed. The system can detect a passive failure by comparing the output signals of each actuator to a nominal range of output signal for each actuator, and determining that a failure has occurred when an output signal falls outside of its nominal range. Various forms of cooling systems and methods for detecting passive failure are described herein, and with reference to the figures.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Figure 1:
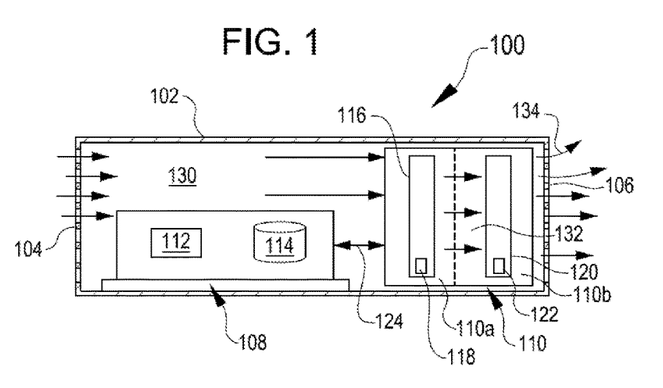
FIG. 1 is a side view diagrammatic illustration of a cooling system for an electronic component in a case with two cooling fans in series, according to some embodiments of the present disclosure.

FIG. 1 is a side view schematic illustrating a first cooling system 100 for an electronic component 108 in a case 102 with two fans 116, 120 in series, according to some embodiments of the present disclosure. The electronic component 108 can include any suitable heat-generating electronic component, e.g. a computer or server board. In some cases, the electronic component can include an onboard controller for operating the cooling system 100, e.g. a baseboard management controller (BMC) 112 and memory 114.

The cooling system 100 draws a cool flow of air 130 from an inlet 104, passing the cool flow of air over the electronic component 108, and drawing the flow of air into a cooling assembly 110 that includes the fans 116, 120. A first section 110a of the cooling assembly 110 contains the first fan 116 and a second section 110b of the cooling assembly contains the second fan 120. The flow of air 130 passes across the first fan 116, through an intermediate volume 132, and across the second fan 120 before being exhausted as an exhaust flow 134 from an outlet 106. The fans 116, 120 are arranged as an in-line dual rotor assembly, and can be the same type and size of fan. The fans 116, 120 may be driven by a DC signal via management components 118, 122 respectively. The management components 118, 122 may also be referred to as fan controllers, and are in communication with the controller 112, or baseboard management controller (BMC), by way of a wired or wireless connection 124.

The controller 112 can activate the fans 116, 120 by providing a control signal to each of the management components 118, 122. Often, the controller 112 can provide the same control signal to management components 118, 122 of the cooling assembly 110; but in some cases, the controller 112 may provide different control signals to each management component. In some cases, it can be advantageous to operate one of the two fans 116, 120 at a higher speed than the other. In particular, it may be more efficient to operate the first fan 116 at a higher speed (e.g. about 19,000 rpm to 22,000 rpm) than the second fan 120, which may be spun at a lower speed (e.g. about 16,000 rpm); although desired fan speeds may vary depending on the size, configuration, and the number of fans in series in a given cooling system. In some cases, different fan speeds may be achieved by the controller 112 providing different control signals to each of the management components 118, 122. In some other cases, the management components 118, 122 may output different driving signals to the respective fans 116, 120 based on a single, given control signal. In such cases, the controller 112 may instead provide a single control signal to both of the management components 118, 122, resulting in the appropriate, and different, fan speeds.

Figure 2:
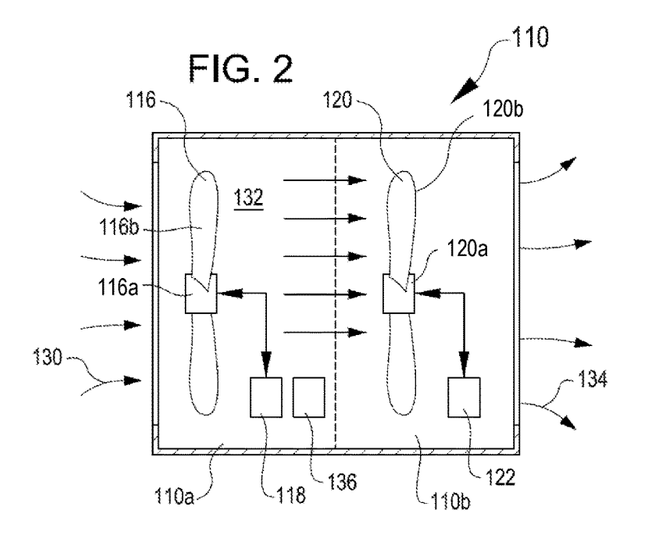
FIG. 2 is a side view diagrammatic illustration of the two cooling fans of the cooling system shown in FIG. 1, in more detail.

FIG. 2 shows the cooling assembly 110 of FIG. 1 in more detail. The flow of air 130 enters the first section 110a of the cooling assembly 110 near the first fan 116, which includes blades 116b and a fan motor 116a controlled by the first management component 118, which may be a microcontroller or comparable device. The flow of air passes through an intermediate volume 132 to the second section 110b of the cooling assembly 110 to pass across the second fan 120, which includes blades 120b and a fan motor 120b under the control of the second management component 122. The cooling assembly 110 can also include a temperature sensor 136. The management components 118, 122 and temperature sensor 136 are in communication with the controller 112 (FIG. 1). Each of the fan motors 116a, 120a contains a sensor, such as a revolution counter, that senses the rotational speed of the respective fan 116, 120. The rotational speed, or a value associated with the rotational speed, is output as an output signal by the respective management components 118, 122. The output signals thus correlate with detected fan speeds of the respective fans 116, 120. Other methods of obtaining an output signal can include any suitable means of directly or indirectly measuring the actual performance of a fan. For example, in some cases, the power draw across the fan can be measured instead of, or in addition to, a rotational speed. Alternatively, a revolution counter or similar device may be positioned outside of the fan motors 116a, 120a.

In some cases, the respective management components 118, 122 can store values associated with the output signal of a fan or other actuator operating normally, in order to use those values as a basis for determining abnormal operation. In this context, normal operation comprises a fan or other actuator operating within expected parameters with respect to fan speed, pressure drop, and power draw under typical operating conditions. Abnormal operation can include a fan or other actuator moving more slowly or more quickly than expected, drawing too much or too little power, or moving too much or too little air, compared to a properly operating fan under the same conditions. Some faults that might cause abnormal operation include a rotor imbalance, a broken fan blade, a broken or improperly wired electrical connection, a power failure, an obstruction in the rotor, or any other physical or electrical fault. An output signal of a properly operating fan or other actuator may be referred to as a nominal output signal, and a range of the output signal that would be expected from a properly operating fan may be referred to as a nominal output signal range. The nominal output signal or output signal range of a fan can vary based on the control signal sent to the fan. When the actual output signal falls within the nominal range, the management components 118, 122 can output the actual output signal. When the actual output signal falls below the nominal range, the management components 118, 122 can indicate a failure in the respective fans 116, 120. For example, the management components 118, 122 may indicate a failure of a fan by returning a zero output signal instead of the actual output signal; or may generate any other suitable signal such as, e.g. a diagnostic signal or error report.

Figure 3:
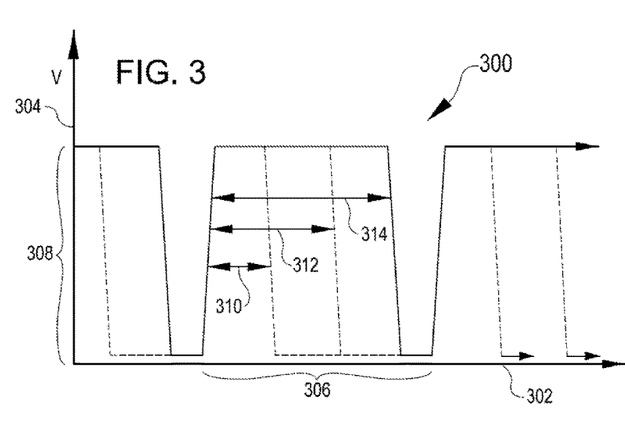
FIG. 3 is a graphical illustration of a control signal for driving a cooling fan, according to some embodiments.

FIG. 3 is a graphical illustration of an example of a control signal 300 for driving a cooling fan, in accordance with embodiments. The control signal 300 may originate from a controller such as the controller 112 shown in FIG. 1. According to this example, the control signal 300 operates by pulse width modulation (PWM), whereby the speed and power of a fan motor is controlled by a pulse width and frequency of the control signal. The x-axis 302 in this example is time, and the y-axis 304 relates to voltage. The control signal 300 comprises a repeating signal at a predetermined voltage 308 and a frequency causing a consistent wavelength 306 between pulses. The power of the control signal 300, which directs the fan motor speed, is determined by the width of the pulse. Shown are illustrative examples of a long or high-power pulse 314 which would correlate with a high fan speed, a short or low-power pulse 310 which would correlate with a low fan speed, and an intermediate pulse 312 that would correlate with an intermediate fan speed.

Other forms of control signals are possible within the scope of this disclosure. For example, fan and pump motor controllers may be driven by a voltage-based or current-based signal, where the voltage or current of a control signal is correlated with the fan speed. In some other cases, fan and pump motor controllers may be driven by a control frequency, with a higher frequency being associated with a higher motor speed. In any event, the control signal 300 may be assigned a value that correlates with the speed of a fan or motor driven by the control signal.

In the case of a PWM control signal, as shown in FIG. 3, the value may be expressed as a percentage based on the pulse width over the signal wavelength (e.g. 0% when there is no signal, and 100% when the signal is continuous), by a pulse width (e.g. in ns or µs), or as a percentage of a maximum power.

Figure 4:
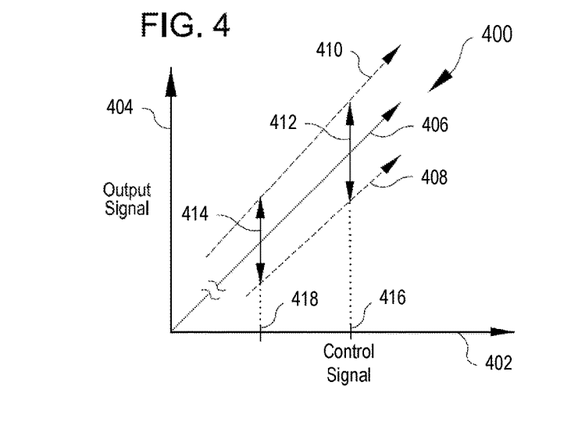
FIG. 4 is a graphical illustration of a relationship between an output signal associated with a cooling fan and a control signal, according to some embodiments.

FIG. 4 is a graphical illustration of a functional relationship 400 between a nominal output signal associated with a cooling fan and a control signal, according to some embodiments. A value associated with the control signal is expressed on the x-axis 402, and a value associated with the output signal is associated on the y-axis 404. The correlation is shown as being linear, however it will be understood that a control signal and output signal may have a nonlinear relationship. The nominal correlation between the control signal and output signal is shown as the nominal output signal 406 as a function of the control signal, such that for any given control signal, a nominal output signal range can be predicted. Although the correlation may theoretically pass through the origin, it will be understood that for low values of the control signal, the output signal may be zero or another value. Therefore, for purposes of determining a nominal output signal range, an envelope between two control signals (e.g. low control signal 418 and high control signal 416) may be used. A range of nominal output signals may be determined based on a lower bound 408 and an upper bound 410 that enclose the nominal output signal 406. In some cases, the range of nominal output signals can be based on a percentage of the nominal value, e.g. plus or minus 10% of the nominal value, plus or minus 5% of the nominal value, plus or minus 2%, or any other suitable range. A range of nominal output signals may extend farther with respect to the nominal value in one direction than another. For example, a range of nominal output signals may extend by a first percentage above the nominal value, and a different second percentage below the nominal value. In some cases, the specific range may be based on an uncertainty or error rate associated with a sensor, such as a revolution counter, associated with an actuator. Thus, for a high control signal 416, a high range of nominal output signals 412 may be expected; and for a low control signal 418, a low range of nominal output signals 414 may be expected. A nominal output signal, and range of nominal output signals, may be determined for each control signal generated for controlling a fan. In some cases, as in the cooling system 100 shown in FIG. 1, determining nominal output signals may include determining nominal output signals for as few as two fans; however, in systems having multiple parallel cooling assemblies, additional nominal output signals may be determined. In some cases, a functional relationship between a given control signal value and a nominal output signal value may be determined empirically, such that data associated with a given control signal value may be correlated directly with data associated with an output signal. The range of nominal output signals may exclude zero. For example, in a case where the mode of failure includes an unpowered or underpowered fan that remains free-spinning due to local airflow, the output signal may represent the free-spinning speed of the failed fan. In such cases, the means of outputting a diagnostic signal from the fan management component or controller may be generating a zero value instead of outputting the value normally associated with the speed of the free-spinning fan.

Figure 5:
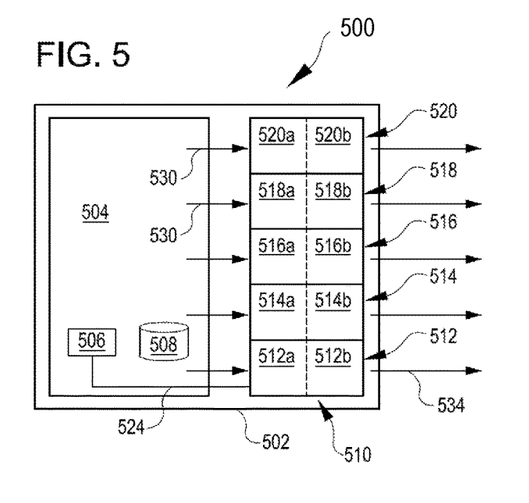
FIG. 5 is a top view diagrammatic illustration of a second cooling system for an electronic component in a case having cooling fans both in series and in parallel, according to some embodiments.

For example, FIG. 5 is a top view schematic illustrating a second cooling system 500 for an electronic component 504 in a case 502 having an arrayed cooling assembly 510 that can include a plurality of cooling fan assemblies 512, 514, 516, 518, 520, each containing subsections (e.g. 512a-520a and 512b-520b) containing fans in series, according to some embodiments. In the cooling system 500, a common controller 506 with memory 508 may be in control of each of the cooling fan assemblies 512-520. Thus, the arrayed cooling assembly 510 can move the flow of air 530 through the cooling system 500 and exhaust the flow of air as an exhaust stream 534. The second cooling system 500, by providing for redundancy, can be further configured so that, if the controller 506 detects that a cooling fan assembly, e.g. cooling fan assembly 512 has a failure in either the first or second subsection 512a, 512b, the remainder of the cooling fan assemblies 514-520 may passively compensate for the failure by continuing to provide cooling; or may actively compensate for the failure by increasing a flow rate through some or all of the remaining cooling fan assemblies.

Figure 6:
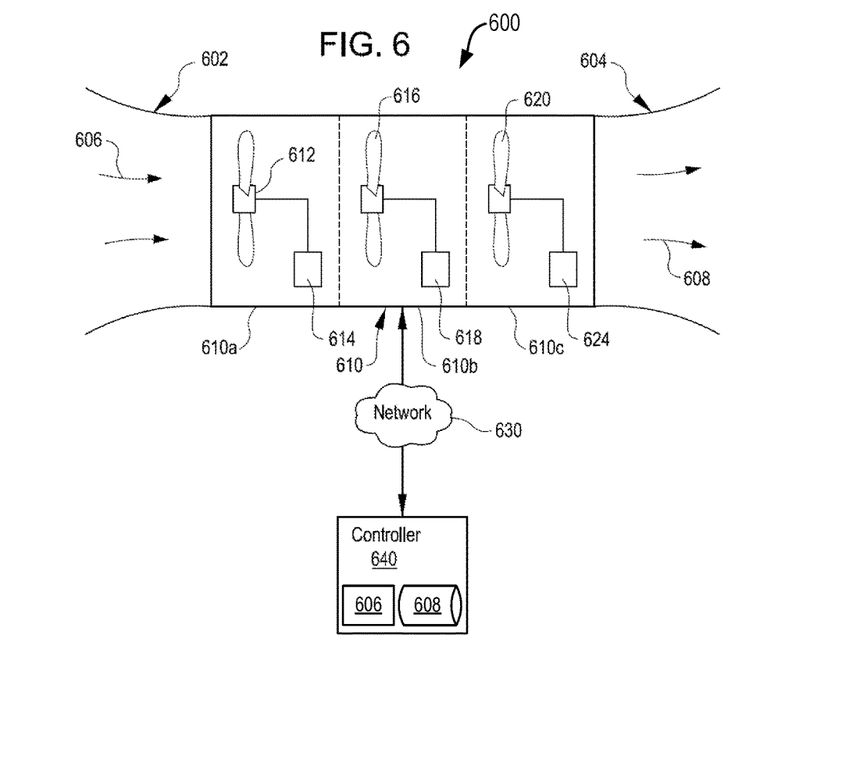
FIG. 6 is a side view diagrammatic illustration of a third cooling system including a series of cooling fans arranged between two reservoirs, according to some embodiments.

In some cases, a cooling system may be external from a cooled component. For example, FIG. 6 is a side view schematic illustrating a third cooling system 600 including a series of cooling fans 612, 616, 620 arranged between an inlet and outlet 602, 604, according to some embodiments.

The system 600 can be employed to push air from the inlet 602 to the outlet 604 in order to either produce a low-pressure region at the inlet 602, e.g. for pulling warm air out of a component to be cooled; or to produce a high-pressure region at the outlet 604 for forcing cool air into a component to be cooled. The inlet flow 606 and outlet flow 608 may pass through a cooling assembly 610 comprising a series of sections 610a-c, each containing a respective fan 612, 616, 620 and respective fan management component 614, 618, 624 operable to control operates the fans by way of control signals, and to detect output signals from each fan corresponding to the rate of movement of each fan. Although three fans 612, 616, 620 are shown, it will be understood that any suitable number of fans may be employed in series.

The system 600 includes a controller 640, similar to the controller 112 of FIG. 1, which can include a processor 642 and memory 644 for controlling operation of the cooling system. The controller 640 can communicate with the fan management components 614, 618, 624 via a network 630, which may include wireless or wired connections. The cooling system 600 may be connected with an individual electronic component for providing cooling to the component; or may be configured to service multiple electronic components. For example, the cooling system 600 may be employed as an air handler for pushing cool air into a cool aisle of a datacenter, or for removing hot air from a hot aisle of a datacenter.

Figure 7:
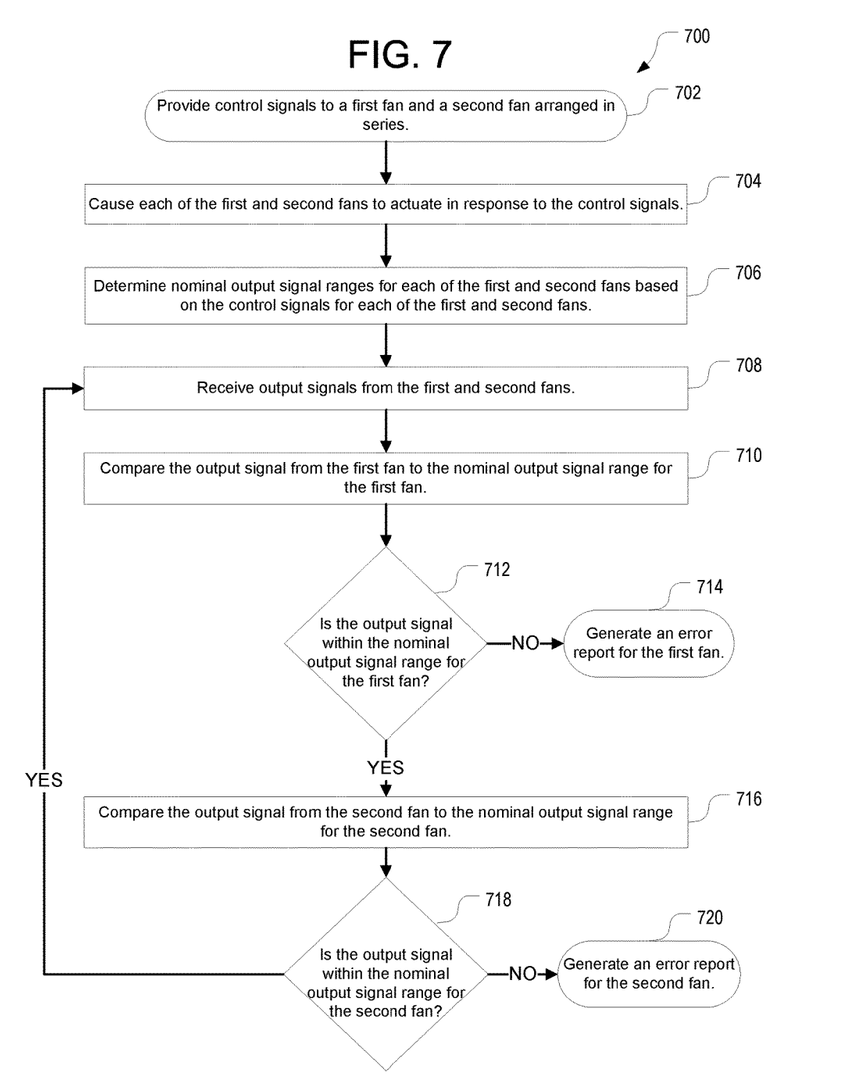
FIG. 7 illustrates a first example process for providing passive failure detection in fans arranged in series, according to some embodiments.
Figure 8:
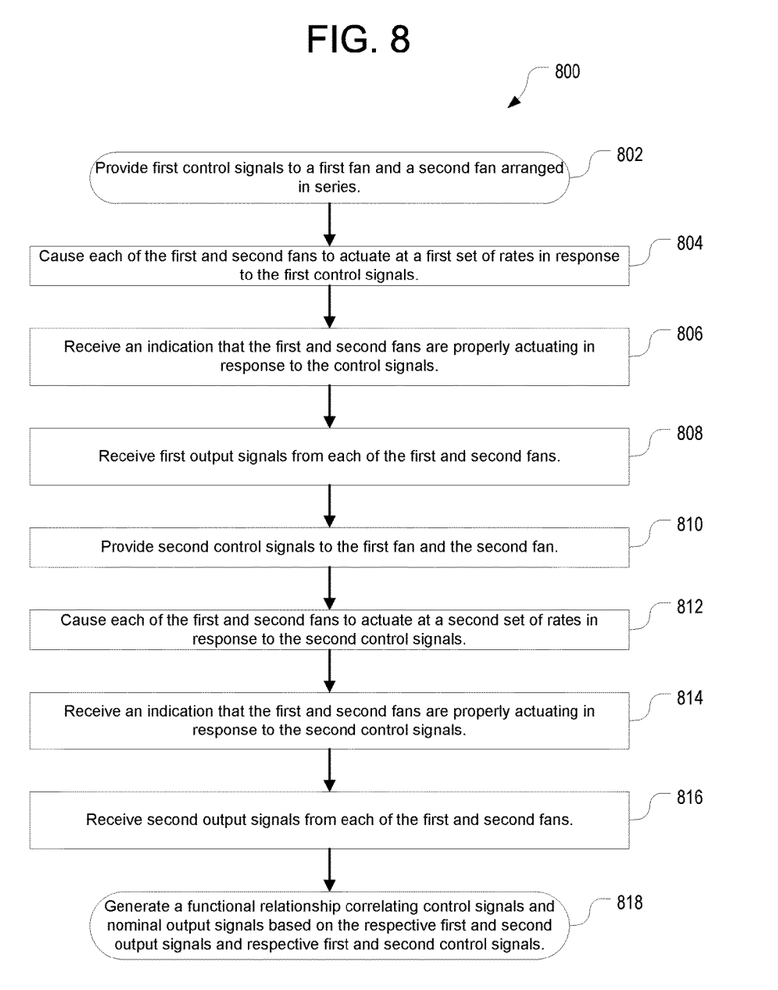
FIG. 8 illustrates an example process for determining a functional relationship between output and control signals for fans arranged in series, according to some embodiments.
Figure 9:
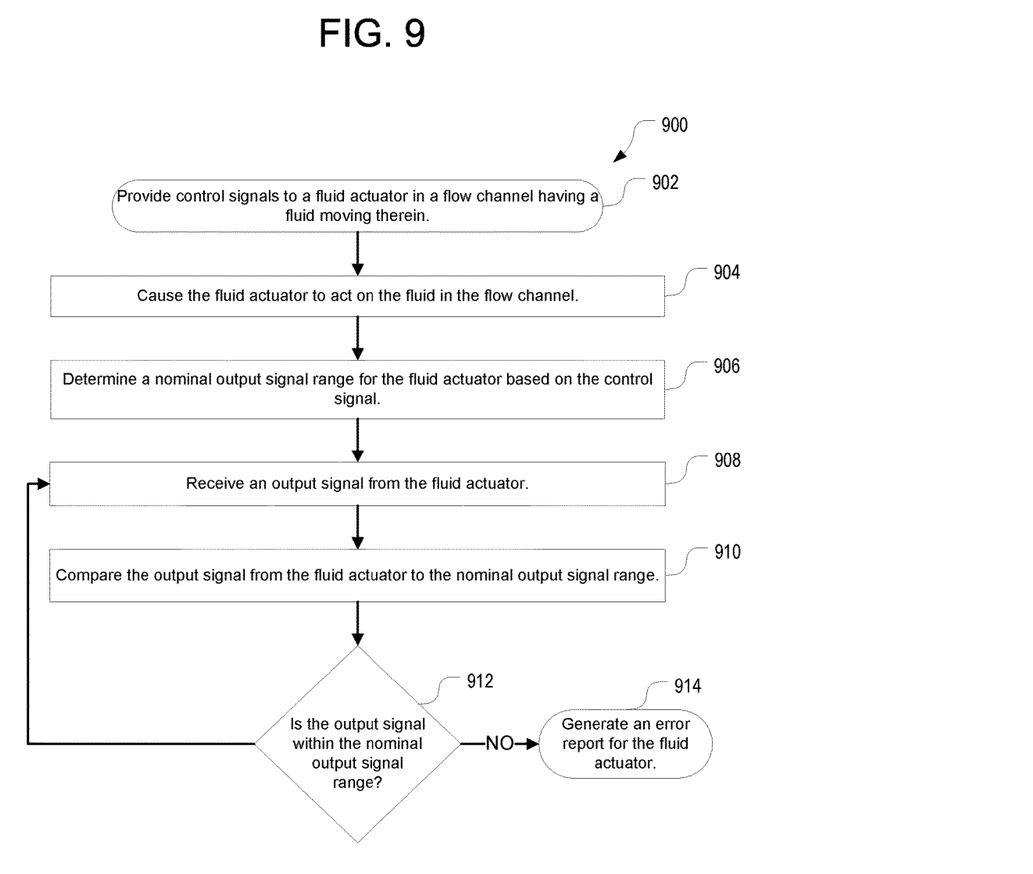
FIG. 9 illustrates an example process for providing passive failure detection, according to some embodiments.

FIGS. 7-9 illustrate example processes for providing passive failure detection in an actuator. Some or all of the processes 700, 800, and 900 (FIGS. 7-9) (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 7 illustrates a first example process 700 for providing passive failure detection in fans arranged in series, according to some embodiments. Steps shown in the example process 700 can be implemented in accordance with systems for cooling one or more electronic components, for example as shown in systems 100, 500, or 600 of FIG. 1, 5 or 6. In some embodiments, a control signal can be provided to a first fan and a second fan arranged in series (act 702). The fans can actuate or spin in response to the control signal or signals (act 704). The system can determine appropriate output ranges, i.e. nominal output ranges, for each of the first and second fans based on the control signal (act 706). In some cases, the nominal output ranges can be the same, i.e. when the fans are substantially identical and spun at the same rate; but in some cases the nominal output ranges can be different, particularly if one fan is configured to spin faster than the other fan. The system can receive output signals from each of the first and second fans (act 708). In some cases, the output signals can be received at a controller that controls both fans, i.e. a baseboard management controller, which can receive the output signals. In some other cases, the output signals can be received at local controllers, such as fan management components or fan microcontrollers. The system can compare the output signal from the first fan to the nominal output range of the first fan as determined based on the control signal to the first fan (act 710). If the output signal is outside of the nominal range (act 712), the system can generate a diagnostic signal (e.g., an error report) indicating a failure at the first fan (act 714). Otherwise, the system can compare the output signal from the second fan to the nominal output range of the second fan, as determined based on the control signal provided to the second fan (act 716). If the output signal for the second fan is outside the nominal range for the second fan (act 718), the system can generate a diagnostic signal (e.g., an error report) indicating a failure at the second fan (act 720). It will be understood that an order of comparing the output signals of the first and second fans to their respective nominal ranges is shown for illustrative purposes only, and is non-limiting. The output signals of the first and second fans can be compared to the respective nominal output ranges for the first and second fans in any order, or simultaneously. For example, in some embodiments, the output signals of the first and second fans can be compared of the nominal ranges for the first and second fans at the same time. In some other embodiments, the output signal for the second fan may be compared with the respective nominal output range of the second fan before the output signal for the first fan is compared to its respective nominal output range. Similarly, the generation of each diagnostic signal can be performed after each respective comparison, or can be performed after both comparisons have taken place. In some cases, a single, combined diagnostic signal can be generated that contains information pertaining to the first fan, the second fan, or to both fans. Where the diagnostic signal is an error report, the error report or reports can be logged, or may be configured and forwarded for display to a user as an error message. In some cases, the error reports can include an identifier of the failed fan, or of an associated electronic component that is served by or co-located with the failed fan. The system can then iteratively monitor for output signals by continuing to receive output signals from the first and second fans (act 708).

FIG. 8 illustrates an example process 800 for creating a functional relationship between output and control signals for fans arranged in series, according to some embodiments. Steps shown in the example process 800 can be implemented in accordance with systems for cooling one or more electronic components, for example as shown in systems 100, 500, or 600 of FIG. 1, 5 or 6. In particular, the process 800 relates to generating a functional relationship between a control signal and a nominal output signal or nominal output signal range for use, e.g. in processes such as process 700 above or process 900 below. Such functional relationships can be used to generate a nominal output signal based on a control signal.

According to embodiments, a cooling system can provide first control signals to a first fan and a second fan arranged in series (act 802). The system can then, via the first control signals, cause the first and second fans to actuate or spin in order to move a working fluid such as air (act 804). The system can receive an indication that the first and second fans are actuating correctly (act 806). In some cases, receiving the indication can include receiving a user input indicating that the system is functioning properly. In some cases, the indication can include measuring an attribute of fan performance, such as a power draw, and determining that the attribute of fan performance is present above a predetermined threshold. Then, first output signals can be received from each of the first and second fans, and the output signals can be stored (act 808). The system can then cause each of the first and second fans to actuate at a second set of rates in response to second control signals (act 812). The system can receive an indication that the first and second fans are properly actuating in response to receiving the second control signals (act 814). The system can then receive second output signals from each of the first and second fans (act 816). Given the first set of control signals, the second set of control signals, and the first and second sets of output signals, the system can then determine a functional relationship that correlates a value associated with each control signal with a nominal output value (act 818). The above-described calibration methods can be applied based on any suitable number of fans in an arrangement, also including a single fan or including more than two fans. In some cases, additional fan speeds may be subjected to calibration by providing additional control signals at various intensities. The system can also impose an uncertainty or range on each set of nominal output signals by, e.g., adding a predetermined uncertainty range or percent range to each nominal output signal.

FIG. 9 illustrates an example process 900 for providing passive failure detection in an actuator, according to some embodiments. Steps shown in the example process 900 can be implemented in accordance with systems for cooling one or more electronic components, for example as shown in systems 100, 500, or 600 of FIG. 1, 5 or 6. In particular, the process 900 relates to a method of controlling a single actuator, which may include a fan or a pump, or other similar device, in a fluid stream having a fluid flow moving therein, e.g. due to other actuators or other means of forcing fluid flow. According to embodiments, a cooling system can provide a control signal or signals to an actuator in a flow channel, such as a pipe, duct, or enclosure having fluid flowing therein (act 902). The moving fluid, or working fluid, may be any suitable cooling fluid such as air, water, coolant, or the like. The actuator can act on the fluid in response to receiving the provided control signal or signals (act 904). The system can determined a nominal output range for an output of the actuator based at least in part on the control signal (act 906), e.g. using methods similar to those described above with respect to process 800 (FIG. 8), or based on a predetermined value or range of values. The system can receive an output signal from the actuator that corresponds to a measured performance attribute of the actuator, such as but not limited to an actual rotational speed, or related to a rotational speed (act 908). The system can then compare the output signal, which relates to an actual rotational speed, to the nominal output signal (act 910). If the output signal is within the nominal output range (act 912), then the system can continue to monitor the output signal from the actuator (act 908). Otherwise, if the output signal falls outside the nominal output range, then the system can generate an error report for the actuator (act 914).

Figure 10:
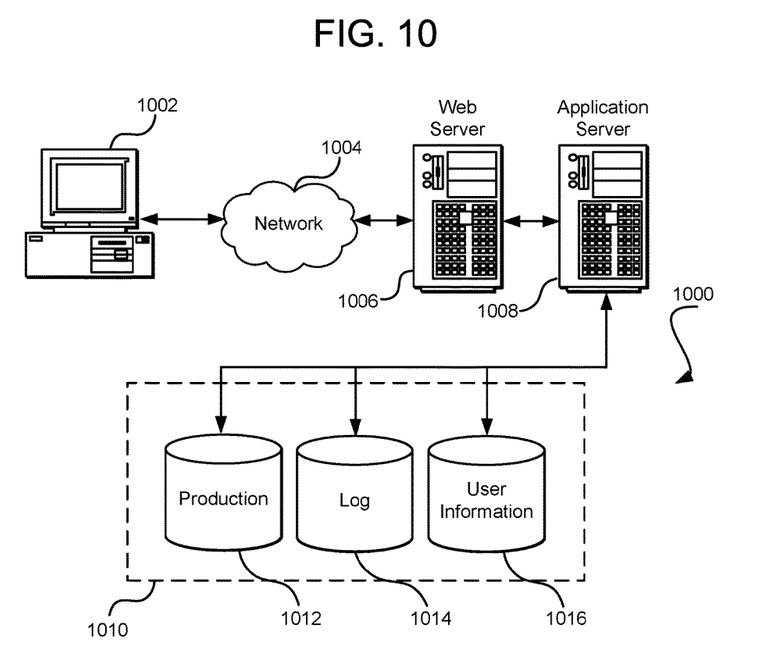
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for detecting a passive failure in a cooling system that includes two fans in series in a server, the system for detecting comprising:
    a first fan of the two fans arranged to act on air in the server;
    a management component electrically coupled with the first fan and operable to cause movement of the first fan in response to receiving a control signal, and further operable to generate an output signal based on actual movement of the first fan; and
    a controller including a processor and memory, the memory storing nontransitory instructions executable by the processor to:
        generate the control signal to cause movement of the first fan via the management component;
        receive the output signal from the management component;
        determine a nominal range of the output signal associated with normal operation of the first fan based on the control signal; and
        determine, based on the output signal being nonzero and outside of the nominal range, that the first fan has failed in a free spinning state, whereby airflow acted on by a second fan of the two fans causes the first fan to spin passively.

2. The system of claim 1, further comprising a temperature sensor arranged in a fluid pathway containing the two fans, wherein the controller is configured to:
    receive temperature information from the temperature sensor; and
    cause the management component to change a speed of the first fan based on the received temperature information.

3. The system of claim 1, wherein the nominal range does not include a zero valued output signal.

4. The system of claim 1, wherein the management component comprises a fan controller, and wherein the fan controller is operable to apply a rotating force to the first fan based on the control signal, to detect a rotational speed of the first fan, and to generate the output signal based on the rotational speed of the first fan.

5. The system of claim 1, further comprising a heat-generating electronic component located in the server, such that the fluid flows across the electronic component to cool the electronic component.

6. The system of claim 1, wherein:
    the management component is a first management component, and the control signal is a first control signal; and wherein the controller is further configured to:
        cause the first management component to cause movement of the first fan via the first control signal at a first nominal speed; and
        cause a second management component to cause movement of the second fan via a second control signal at a second nominal speed.

7. The system of claim 6, wherein the first fan is an inlet fan and the second fan is an outlet fan, and wherein the first nominal speed is greater than the second nominal speed.

8. A computer-implemented method, comprising:
    outputting a control signal to a first actuator of a group of two actuators, the two actuators being arranged in series, the control signal being associated with a nominal output signal range of the first actuator;
    receiving an output signal from the first actuator, the output signal being associated with an actual speed of the first actuator;

detecting that the first actuator has failed in a free spinning state, whereby airflow acted on by a second actuator of the group of two actuators causes the first actuator to spin passively, by determining, based on the control signal and the output signal, that the output signal is nonzero and outside a nominal range of output signals associated with normal operation of the first actuator; and generating a diagnostic signal based on the detection that the first actuator is in a free spinning state.

9. The computer-implemented method of claim 8, further comprising:

determining a nominal output signal associated with the control signal;

determining a range of output signals that includes the nominal output signal, the nominal output signal being associated with normal operation of the first actuator, and the nominal range of output signals being associated with variation in the normal operation of the first actuator; and wherein determining that the output signal is outside the nominal range of output signals comprises determining that the actual speed of the first actuator is outside a range of expected speeds of the first actuator.

10. The computer-implemented method of claim 8, wherein determining that the output signal is outside the nominal range of output signals comprises:

determining an envelope of output signals indicative of normal operation of the first actuator, the envelope of output signals having a functional relationship with the control signal;

determining, based on the control signal and the envelope of output signals, a range of output signals associated with normal operation of the first actuator for the control signal; and determining that the actual speed of the first actuator is outside a range of expected speeds of the first actuator by determining that the output signal is outside the range of output signals.

11. The computer-implemented method of claim 10, wherein the envelope of output signals includes plus a first percent and minus a second percent of a nominal output signal associated with the control signal.

12. The computer-implemented method of claim 8, wherein the control signal is a pulse-width modulation signal that controls a speed of the first actuator.

13. The computer-implemented method of claim 8, wherein the control signal indicates one or more of: a voltage, a current, or a frequency that controls a speed of the first actuator.

14. The computer-implemented method of claim 8, further comprising:

generating an indication for display to a user, the indication including identifying information concerning the first actuator.

15. The computer-implemented method of claim 8, wherein the control signal is a first control signal, the method further comprising:

based on the determining that the actual speed of the first actuator is outside a range of expected speeds of the first actuator, outputting a second control signal to the second actuator that causes a speed of the second actuator to change.

16. A computer readable storage medium containing nontransitory computer-executable instructions that, when executed by a processor, cause the processor to perform operations, comprising:

receiving an output signal from an actuator in a cooling system containing a flow of a cooling fluid, the actuator being operable to move the cooling fluid, the output signal being associated with movement of the actuator;

comparing the output signal from the actuator with a nominal output signal range of the actuator;

detecting that the actuator has failed in a free spinning state, whereby the flow of the cooling fluid acts on the actuator to cause the actuator to spin passively, by determining, based on the comparing, that the output signal is nonzero and outside the nominal output signal range of the actuator, and generating an indication that the actuator has failed in the free spinning state in response to the detection that the actuator has failed in a free spinning state.

17. The computer readable storage medium of claim 16, wherein the output signal from the actuator indicates a rotational speed of the actuator.

18. The computer readable storage medium of claim 16, further comprising:

determining that the output signal from the actuator deviates from the nominal output signal range of the actuator when the output signal differs from a nominal output signal by more than a predetermined value or more than a predetermined percentage of the nominal output signal.

19. The computer readable storage medium of claim 16, further comprising:

causing a control signal to be provided to the actuator, the control signal being associated with the nominal output signal range of the actuator.

20. The computer readable storage medium of claim 19, wherein comparing the output signal from the actuator with the nominal output signal range of the actuator comprises comparing first data associated with the control signal with second data associated with the output signal.

21. The computer readable storage medium of claim 16, further comprising:

in response to detecting that the actuator has failed in the free spinning state, causing another actuator associated with the flow of the cooling fluid to increase in speed.

* * * * *